(12) United States Patent
Moayeri et al.

(10) Patent No.: US 7,815,747 B2
(45) Date of Patent: Oct. 19, 2010

(54) SYSTEM AND METHOD FOR WASHING EGGS

(75) Inventors: Hossein Moayeri, Barneveld (NL); Adrianus Van Pinxteren, Eemnes (NL)

(73) Assignee: FPS Food Processing Systems B.V., Nootdorp (NL)

( * ) Notice: Subject to any disclaimer, the term of this patent is extended or adjusted under 35 U.S.C. 154(b) by 739 days.

(21) Appl. No.: 10/502,599

(22) PCT Filed: Jan. 29, 2003

(86) PCT No.: PCT/NL03/00064

§ 371 (c)(1),
(2), (4) Date: Jan. 27, 2005

(87) PCT Pub. No.: WO03/063761

PCT Pub. Date: Aug. 7, 2003

(65) Prior Publication Data

US 2005/0120964 A1 Jun. 9, 2005

(30) Foreign Application Priority Data

Jan. 29, 2002 (EP) ................................. 02075308

(51) Int. Cl.
*G03D 3/00* (2006.01)
(52) U.S. Cl. .................................................. 134/122 R
(58) Field of Classification Search ............... 134/112 R
See application file for complete search history.

(56) References Cited

U.S. PATENT DOCUMENTS

| | | | | |
|---|---|---|---|---|
| 4,356,920 A | * | 11/1982 | van der Schoot | 209/513 |
| 4,411,574 A | * | 10/1983 | Riley | 414/796.3 |
| 4,843,958 A | * | 7/1989 | Egosi | 101/2 |
| 5,277,320 A | * | 1/1994 | Corkill et al. | 209/511 |
| 6,029,424 A | * | 2/2000 | McEvoy et al. | 53/443 |
| 6,152,284 A | * | 11/2000 | Sandberg et al. | 198/432 |

FOREIGN PATENT DOCUMENTS

WO WO-99/27362 6/1999

OTHER PUBLICATIONS

Diamond Systems brochure, "Egg Graders", Jul. 1997.

* cited by examiner

*Primary Examiner*—Michael Cleveland
*Assistant Examiner*—Samuel A Waldbaum
(74) *Attorney, Agent, or Firm*—Stites & Harbison PLLC,; Marvin Petry; Stephen J. Weyer

(57) ABSTRACT

A system for washing a stream of eggs which are uniformly distributed on m feed rows of a transport device and assume well-defined positions thereon, comprising—a feeding section, having, at least at the location of the washing of the eggs, m feed rows with the eggs on diabolos which are attached to cross axes whose ends are connected to endless chains, a washing device through which the eggs on the feed rows are passed and washed,—a dirt detection device for testing the washed eggs for residues of dirt, whereby, according to a well-determined procedure carried out by, for instance, a computer, each egg is assigned a dirt grade, while the washed eggs are passed on the feed rows along the detection device, a discharge device to which are allocated, in accordance with and following said procedure, those eggs whose dirt grade has exceeded a predetermined limit, and which discharges them as dirty eggs from the feed rows, while the other eggs proceed as clean eggs on a follow-on conveyor virtually from the discharge device, the follow-on conveyor being composed of n rows, and—a replacing device for replacing these discharged eggs into the feed section, wherein the discharge device discharges the dirty eggs immediately after the detection device and returns them along at least a single return row, parallel to and in upstream direction relative to the feed rows, and the replacing device replaces these discharged dirty eggs virtually immediately before the washing device. Such a system enables far-reaching optimization of the associated washing process.

26 Claims, 2 Drawing Sheets

SYSTEM AND METHOD FOR WASHING EGGS

The present invention relates to a system and method for washing a stream of eggs.

Prior methods and systems for washing eggs are generally known and are used, in particular, in packing stations for eggs. The eggs that are supplied there come, for instance, directly from laying batteries and are sorted and packaged in these packing stations. The type of sorting machine used in these stations has a capacity of about 1 million eggs a day. In the United States and Japan, the regulations for these sorting and packing operations require that prior to this sorting and packing, the eggs be washed. To that end, the sorting machines are equipped in-line at the in-feed side with washing apparatus. Consequently, such washing apparatus has a corresponding capacity. To obtain a good washing result, the control and use of such an apparatus must meet high standards.

Such a system is, for instance, shown in a brochure of Diamond Systems, "Egg Graders", July 1997. In a schematic overview in this brochure, a return line for dirty eggs is indicated. It runs from the beginning of the main chain or main conveyor back to a supply portion where the eggs coming from a laying battery are collected.

Over the last years, in this branch of industry, increasingly stringent requirements have been imposed on the conditions relating to hygiene and environment. As a consequence, the washing path is increased in length and/or in time. For the above-mentioned packing stations this not only requires a very efficient and effective management, but typically more floor space as well. With the above-mentioned apparatus, this is not possible.

SUMMARY OF THE INVENTION

To solve the above-mentioned problems, the present invention provides a system according to the opening paragraph, characterized in that immediately after the detection device, the discharge device discharges the dirty eggs and returns them along at least a single return row, parallel to and in upstream direction relative to the feed rows, and that the replacing device replaces these discharged dirty eggs virtually immediately before the washing device.

This set-up has several considerable advantages.

For instance, the layout and size of the sorting machine itself will not have to be adapted because the stream of feed-through eggs is distributed over a number of rows customary for such a machine. Further, in a very suitable manner, for each packing station, more in particular for each apparatus, the optimal combination of length for the washing device, the level of the dirt grade and the number or rows for feedback, and thereupon for insertion, can be determined. It should be considered here that the length of the washing device is directly related to the washing program followed. In addition, it will be clear that by virtue of the present ostensibly small change with respect to the prior art, the construction of long feedback loops or return paths, for instance from a conveyor belt at the end of the sorting path, a so-called off-grade belt, at a position downstream of the packing conveyors is thus avoided. As a result of these features, with great advantage, a clearly more economical management will be obtained.

More in particular, the system according to the invention is characterized in that the at least single return row is directed through the washing device.

A particular advantage of this addition is the possibility of thereby influencing the washing program in relation to the length of the washing device and the washing time to be selected. In particular, thus, washing devices of shorter length can be obtained.

A further exemplary embodiment of the system according to the present invention is characterized in that the system includes a feed-through control element between the feeding device and the follow-on conveyor.

What is to be regarded as a particular advantage thereof is that the supply of eggs to the washing device and feed-through of eggs found suitable can then be geared to each other in a very adequate manner.

More in particular, the system is then characterized in that the feed-through control element comprises an egg-transfer element with which the clean eggs are transferred from the feeding device to the follow-on conveyor having n rows, with n=m, and a velocity control element with which the velocity of the follow-on conveyor $v_n$ is set so as to be less than that of the feeding device $v_m$. In that case, with advantage, for the egg-transfer element a dosing device is used.

In a suitable manner, this extension according to the invention offers the possibility, with different settings of the washing program for the washing device, to adapt the capacity of the entire system accordingly.

In yet another exemplary embodiment, the system according to the present invention is characterized in that in the above-mentioned procedure, further, all empty positions on the transport device, among which those of the discharged eggs, are registered in a zone directly downstream from said discharge of eggs by the discharge device, whereby a set of fill-in positions with corresponding fill-in position signals are obtained, and the system further comprises an inserting device by which, in response to the fill-in position signals, eggs coming from at least a single row from the feed rows mentioned, are inserted as insert eggs on pre-selected positions from the set of fill-in positions, while at the location of the inserting device, the number of rows of the follow-on conveyor is reduced from m to n, with $1 \leq n < m$.

This handling procedure is very suitable specifically for the type of sorting machine where the eggs, from the very beginning, when being supplied, are assigned a fixed place in the machine. Although a number of dirty eggs are discharged, this handling operation is also mapped, preferably automatically with computer controlled tracking systems, so that in a highly advantageous manner, all positions of all eggs remain known. Through insertion, the empty positions can then be used again so that the capacity of the following sorting section can be optimally adjusted.

BRIEF DESCRIPTION OF THE DRAWINGS

Further elaborations according to the present invention will be elucidated hereinbelow in more detail with reference to a few drawings, wherein.

DETAILED DESCRIPTION

In these Figures, the same sections or parts have the same indication or reference number.

Figure 1:
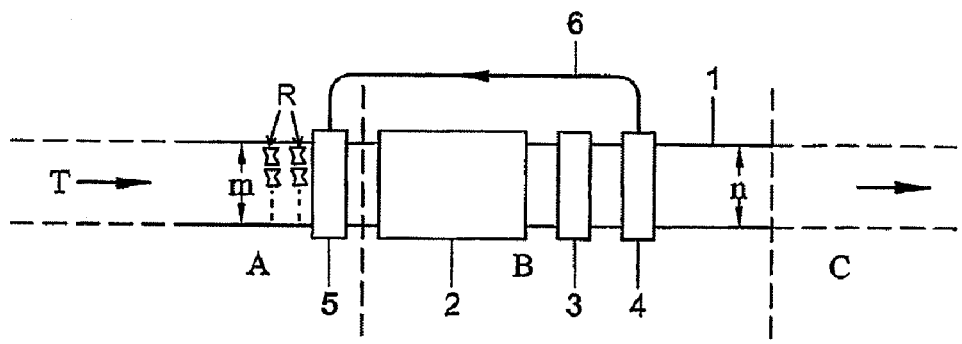
FIG. 1 shows an outline of a first exemplary embodiment of the system according to the invention.

In FIG. 1, with transport device 1 for transport of products such as eggs in the transport direction T, the eggs are washed in a washing device 2. Generally, such a transport device is built up from cross axes with rollers with the ends of the axes connected to endless chains running over chain wheels, with typically one of the pairs of chain wheels, upstream or downstream, being driven by a motor. Preferably, the rollers are diabolos, with successive diabolos of successive axes forming a nest for an egg to be transported (indicated collectively as R in FIG. 1). Also, the diabolo construction can be designed such that each egg has its own two diabolos to thus prevent contamination through common use by the preceding and successive egg. The successive nests in transport direction which constitute a sequence of positions form rows. An example of this is described in WO 00/01229, also of applicant. Washing devices for eggs have long been known and are described, for instance, in U.S. Pat. Nos. 5,460,083 and 4,985,956.

In FIG. 1, with two broken lines transverse to the transport direction, the successive sections of the system are distinguished: A concerns the feeding section, B the washing section, and C the follow-on conveyor.

In the feeding section A, the eggs are placed on the diabolos R, for instance by suction cups, after being picked up from trays, or from a feeding trough, with the eggs typically coming from laying batteries. Located on the rollers, the egg are passed through the washing device 2. This section comprises m rows, further called feed rows. After having been washed, the eggs are guided along a dirt detection device 3, as described in, for instance, WO 99/27362 of applicant. In this device, in the manner described in that publication and indicated hereinabove, a selection based on dirt can be made.

With the aid of a discharge device 4, eggs assessed to be too dirty according to a procedure carried out by, for instance, a computer, are guided back as discharged eggs along at least a single return row 6 to the feed-in for the washing device. Such a discharge device can, for instance, be designed as described in WO 00/01229, in particular with respect to FIG. 8 thereof. The control of this discharge device takes place at the command of the above-mentioned procedure.

The clean eggs are led in the transport direction T via the next section of the transport device, follow-on conveyor C, to the further sorting and packing section of the machine. For these sections of the system, n rows are indicated. In general, the sections A, B and C will link up with each other having the same number of rows, so that m=n applies.

The eggs on the return row 6 are replaced into the feeding section A with the aid of a replacing device 5. According to the invention, this happens virtually immediately before the washing device 2, as is represented in the outline according to FIG. 1. It will be clear to any skilled person that this preferably involves replacement on rollers. However, if the rollers only start at that point, replacement can just yet take place between the eggs on a flat conveyor belt.

In the system according to the invention, the positions of discharge, of the return row and of replacement are selected such that as little time and distance as possible are lost. Generally, the return row runs directly next to and parallel to the rows in the washing device in upstream direction.

Figure 2:
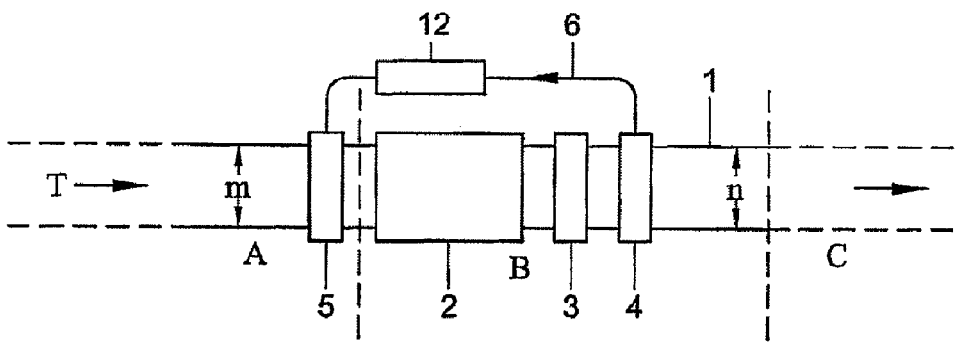
FIG. 2 shows an outline of a second exemplary embodiment.

In FIG. 2 an outline similar to that according to FIG. 1 is shown. The at least single return row 6 is led through an added washing section, return washing device 12. Preferably, washing device 2 and return washing device 12 will be accommodated in the same housing. By using this return washing device, an advantageous possibility of further shortening the washing device 2 is obtained.

Figure 3:
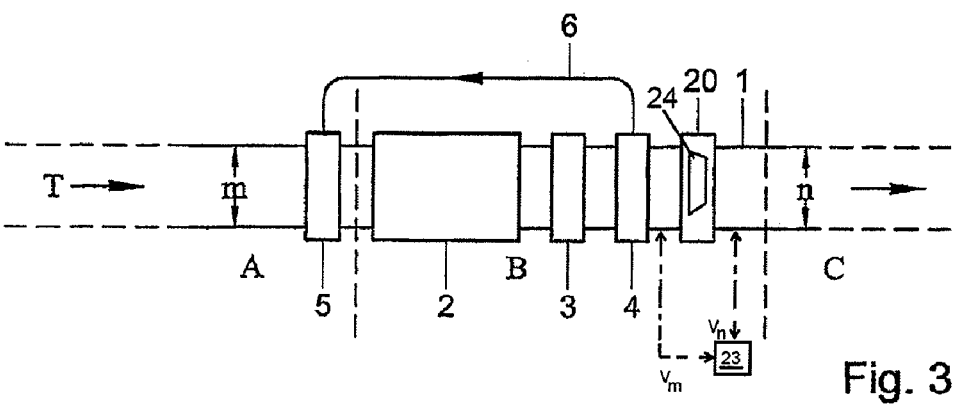
FIG. 3 shows an outline of a third exemplary embodiment.

In FIG. 3, a further embodiment of the system according to the invention is represented. At the location of the transition between the washing section B and the follow-on conveyor C, a feed-through control element 20 is provided. With this element 20, in a suitable manner, it is regulated that particularly the capacity of the sections following the washing section B remain at least equal. The fact is that the discharge of eggs yields empty positions which otherwise are no longer utilized in the further course of sorting.

In a special embodiment, this feed-through control element 20 comprises, according to the present invention an egg transfer element 24 with which the clean eggs are transferred from the feeding device to the follow-on conveyor having n rows, with n=m, and a velocity control element 23 with which the velocity of the follow-on conveyor $v_n$ is set so as to be less than that of the feeding device $v_m$. Although this egg transfer element 24 results in an interruption in the conveyor 1 as a whole, this is utilized in an advantageous manner to eliminate the empty positions on the follow-on transporter. To keep the capacity as constant as possible, also the velocity can be adapted by a velocity control element, in a manner such that it can be set, and possibly be further fine-adjusted, such that $v_n$ is less than $v_m$. The control of this control element is coupled in a suitable manner to the computer which also effects the control of the washing, the dirt detection and the selection.

In particular, the egg transfer element 24 comprises a dosing unit, which consists of a flat belt on which the eggs are all brought together and whence they are rearranged on the rollers of the follow-on conveyor.

Figure 4:
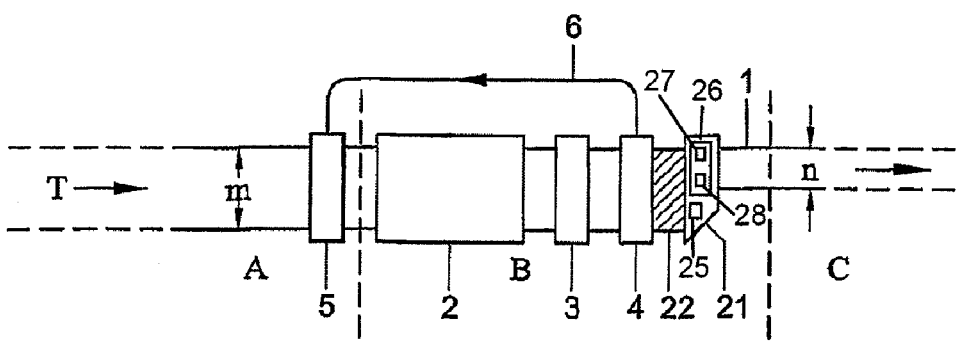
FIG. 4 shows an outline of a fourth exemplary embodiment.

In FIG. 4, in an outline, a still further exemplary embodiment of the system according to the invention is represented. In the washing section B, now, an inserting device 21 is indicated and the area between the discharge device 4 and this inserting device 21 is hatched and is further indicated as zone 22. In this embodiment, the procedure carried out by the detection device also provides for registration of the positions which become vacant upon discharge by the discharge device 4 of eggs which are too dirty. This yields a set of fill-in positions corresponding to fill-in position signals which, as soon as the inserting device is to insert eggs on the positions fallen vacant earlier, controls the inserting device. The insertion takes place on pre-selected positions. As the eggs to be inserted come from a row intended for that purpose, the numbers of rows m and n will generally be different. For instance, (m−n) can equal 1, but larger differences are also possible. With great advantage, the labels of each egg can be maintained in this manner so that tracing an egg upstream or downstream relative to the washing section is possible in an unequivocal manner.

The row specially destined for insertion will generally be located at an outside of the transport device. However, also other manners of design are possible. A further possibility is that, conversely, the replacing device replaces the eggs coming from the return row into this row destined to be inserted. Also, a design may be chosen wherein, prior to insertion, the procedure provides for eggs from adjacent rows being fed into the insertion row mentioned to thus fill the empty positions as optimally as possible.

In FIG. 4, the inserting device 21 is not indicated in detail, rather depicted schematically. In particular, in addition to a feeding element for the rows (m=n), it comprises a distribution element 26 which, in response to the fill-in position signals of the computer, distributes the insert eggs over, and inserts the eggs into, the pre-selected fill-in positions. More in particular, the distribution element 26 comprises a buffer portion 27 and an inserting mill or inserting belt, indicated schematically as 28.

As regards the discharge device 4, several designs can be used. For instance, the eggs can be taken from the stream of eggs with grippers or suction cups 25.

Figure 5:
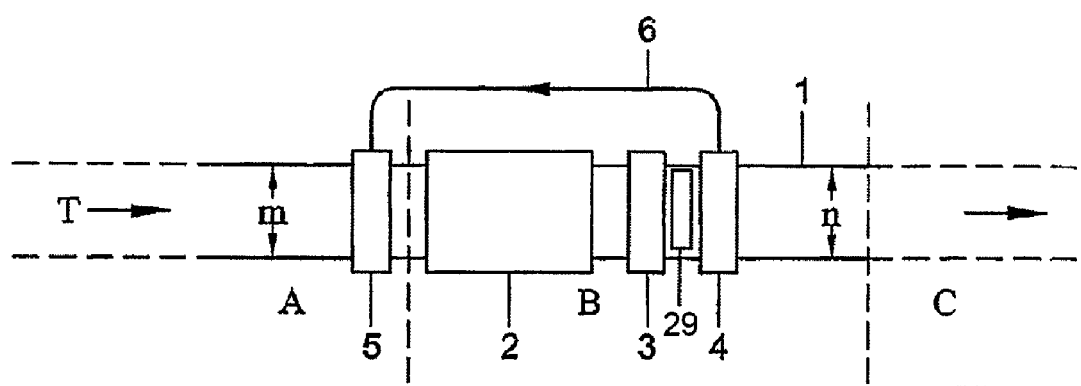
FIG. 5 shows an outline of a fifth exemplary embodiment.

Referring now to FIG. 5, in an alternative embodiment, the design of discharge device 4 allows for the eggs to be discharged downwardly from the stream of eggs and to be guided further in a return row. More in particular, immediately before the discharge device, separate, tiltable transport units 29 can be used.

From the above, it will be clear that the inserting device can also be deployed at other positions in such a system. Generally, the Figures, which represent such a system only in outline or schematically, can be modified on many points without thereby departing from the essence of the invention. In particular, the addition of the parallel washing devices 21 will contribute to a further optimization of the washing of eggs or similar products. Also encompassed by the invention are specifically the methods in accordance with the design of the system as described hereinabove.

The invention claimed is:

1. A system for washing a stream of eggs comprising:
a feeding section comprising a transport device having rollers defining m feed-rows of nests, each nest being configured to accommodate a single egg, the rows of nests extending in the transport direction of the transport device;
a washing device in the feeding section through which the transport device passes and that is configured to wash eggs accommodated in the nests;
a dirt detection device in the feeding section along which the transport device extends and that is arranged downstream of the washing device, and is configured to test the washed eggs for residues of dirt and to assign to each egg a dirt grade while the washed eggs are transported by the transport device along the detection device;
a discharge device immediately downstream from the dirt detection device, absent any egg processing device between the detection device, the discharge device being configured to discharge eggs whose dirt grade has exceeded a predetermined limit;
a follow-on conveyor downstream of the discharge device, the follow-on conveyor having n follow-on rows of nests that extend in the transport direction, each nest being configured to accommodate a single egg and m being larger than n wherein, upstream of the follow-on conveyor, proximate a downstream of the discharge device, the transport device has m rows reduced to n rows;
the discharge device being configured to transfer eggs of which the dirt grade is below the predetermined limit to the feeding section of the transport device;
a return row which receives eggs discharged by the discharge device and returns them in an upstream direction relative to the feed rows,
a replacing device for replacing discharged eggs from said return row to a position immediately upstream of the washing device, absent any egg processing device between the replacing device and the washing device;
an inserting device arranged at a junction between the discharge device and the follow-on conveyor and configured to fill empty nests on the transport device between the discharge device and the follow-on conveyor; and
a controller that is configured to perform a procedure in which all empty nests on the upstream part of the follow-on conveyor are detected and registered in a zone immediately downstream of the discharge device, and configured to determine a dataset of fill-in positions and to generate corresponding fill-in position signals for controlling the inserting device so that in response to said fill-in position signals, eggs positioned in nests from at least a single follow on row of the upstream part are inserted as insert eggs on pre-selected positions of the downstream part, which pre-selected positions are associated with the dataset of fill-in positions.

2. The system according to claim 1, wherein the return row is directed through a return washing section.

3. The system according to claim 1 wherein the feeding section and the follow-on conveyor form a continuous conveyor.

4. The system according to claim 1, wherein the system includes a feed-through control element between the feeding section and the follow-on conveyor.

5. The system according to claim 4, wherein the feed-through control element comprises:
an egg transfer element with which the clean eggs are transferred from the feeding device to the follow-on conveyor having n rows, with n=m, and
a velocity control element with which the speed of the follow-on conveyor $V_n$ is set so as to be less than that of the feeding device $V_m$.

6. The system according to claim 5, wherein the egg transfer element is a dosing device.

7. The system according to claim 1, wherein in the discharge device the eggs are taken from the stream of eggs with grippers or suction cups.

8. The system according to claim 1, wherein in the discharge device the eggs are discharged downwards from the stream of eggs.

9. The system according to claim 8, wherein at least in the part of the transport device immediately before the discharge device, the eggs are located on separate tiltable transport units.

10. The system according to claim 1, wherein the inserting device comprises a distribution element for distributing the insert eggs, and inserting the insert eggs into, pre-selected fill-in positions, in response to the fill-in position signals of a computer.

11. The system according to claim 10, wherein the distribution element comprises:
a buffer portion, and
an inserting mill or inserting belt.

12. A system for washing a stream of eggs which are uniformly distributed on m feed rows of a transport device and assume well-defined positions thereon, the system comprising:
a feeding section, having m feed rows at least at the location of the washing of the eggs;
a washing device through which the eggs on the feed rows are passed and washed;
a dirt detection device located downstream from the washing device, for testing the washed eggs to detect residues of dirt, wherein, each egg is assigned a dirt grade;
a discharge device located immediately downstream from the detection device, absent any egg processing device between the detection device and the discharge device, the discharge device having a structure which discharges eggs off of the feed rows which have a dirt grade exceeding a predetermined limit while allowing the other eggs to proceed as clean eggs on to a follow-on conveyor;

a return row which receives eggs discharged by the discharge device and returns them in an upstream direction relative to the feed rows, and a replacing device located immediately upstream from the washing device, absent any egg processing device between the replacing device and the washer, the replacing device having a structure for receiving the discharged eggs from the return row and feeding them into the washing device.

13. The system according to claim 12, further comprising a return washing section through which the return row traverses.

14. The system according to claim 12, wherein the feeding section and the follow-on conveyor form a continuous conveyor.

15. The system according to claim 12, wherein the system further comprises a feed-through control element between the feeding section and the follow-on conveyor.

16. The system according to claim 15, wherein the feed-through control element comprises:

an egg transfer element with which the clean eggs are transferred from the feeding section to the follow-on conveyor having n rows, with n=m, and a velocity control element with which the speed of the follow-on conveyor $V_n$ is set so as to be less than that of the feeding device $V_m$.

17. The system according to claim 16, wherein the egg transfer element is a dosing device.

18. The system according to claim 12, wherein in the dirt detecting device all empty positions on the transport device, including those of the discharged eggs, are registered in a zone immediately downstream from said discharge of eggs by the discharge device, whereby a set of fill-in positions with corresponding fill-in position signals are obtained, and the system further comprises an inserting device by which, in response to said fill-in position signals, eggs coming from at least a single row from said feed rows are inserted as insert eggs on pre-selected positions from the set of fill-in positions, while at the location of the inserting device the number of rows of the follow-on conveyor is reduced from m to n, with $1 \leq n < m$.

19. The system according to claim 18, wherein there is absent any egg processing devices between said discharge device and the location at which eggs are discharged.

20. The system according to claim 18, wherein the inserting device comprises a distribution element for distributing the insert eggs, and inserting the insert eggs into pre-selected fill-in positions in response to the fill-in position signals of a computer.

21. The system according to claim 20, wherein the distribution element comprises:

a buffer portion, and an inserting mill or inserting belt.

22. The system according to claim 12, wherein, in the discharge device, the eggs are taken from the stream of eggs with grippers or suction cups.

23. The system according to claim 12, wherein, in the discharge device, the eggs are discharged downwards from the stream of eggs.

24. The system according to claim 23, wherein at least in the part of the transport device immediately before the discharge device, the eggs are located on separate tiltable transport units.

25. A method for washing a stream of eggs which are uniformly distributed on feed rows of a transport device and assume well-defined positions thereon, said method using a system comprising:

moving the eggs along a feeding section having m feed rows at least at the location of the washing of the eggs;

washing the eggs in a washing device through which the eggs on the feed rows are passed and washed;

detecting dirt by a dirt detection device which tests the washed eggs for residues of dirt, whereby, each egg is assigned a dirt grade, while the washed eggs pass on the feed rows through the detection device;

discharging the eggs at a discharge device located immediately downstream from the detection device, absent any egg processing device between the detection device and the discharge device, which discharge device has a structure which discharges eggs off of the feed rows which have a dirt grade exceeding a predetermined limit while allowing the other eggs to proceed as clean eggs on to a follow-on conveyor;

returning along a return row eggs which are discharged by the discharge device in an upstream direction relative to the feed rows, and receiving the returned eggs immediately upstream from the washing device by a structure for receiving the discharged eggs and feeding them into the washing device.

26. A method according to claim 25, wherein the eggs are uniformly distributed on feed-rows of a transport device and assume well-defined positions thereon.

* * * * *